United States Patent
Wen et al.

(10) Patent No.: US 7,490,097 B2
(45) Date of Patent: Feb. 10, 2009

(54) SEMI-STRUCTURED DATA STORAGE SCHEMA SELECTION

(75) Inventors: Ji-Rong Wen, Beijing (CN); Shihui Zheng, Shanghai (CN); Hongjun Lu, Hong Kong (CN)

(73) Assignee: Microsoft Corporation, Redmond, WA (US)

(*) Notice: Subject to any disclaimer, the term of this patent is extended or adjusted under 35 U.S.C. 154(b) by 258 days.

(21) Appl. No.: 10/370,859

(22) Filed: Feb. 20, 2003

(65) Prior Publication Data

US 2004/0167904 A1   Aug. 26, 2004

(51) Int. Cl.
G06F 17/30 (2006.01)
(52) U.S. Cl. .................... 707/101; 707/3; 707/102
(58) Field of Classification Search ............. 707/1–10
See application file for complete search history.

(56) References Cited

U.S. PATENT DOCUMENTS

| | | | |
|---|---|---|---|
| 6,804,677 B2* | 10/2004 | Shadmon et al. ......... 707/101 |
| 2002/0169788 A1* | 11/2002 | Lee et al. ............... 707/104.1 |
| 2004/0002957 A1* | 1/2004 | Chaudhuri et al. .......... 707/2 |
| 2004/0044959 A1* | 3/2004 | Shanmugasundaram et al. . 715/513 |
| 2004/0128296 A1* | 7/2004 | Krishnamurthy et al. ..... 707/100 |
| 2004/0143581 A1 | 7/2004 | Bohannon et al. |

OTHER PUBLICATIONS

Philip Bohannon, Juliana Freire, Prasan Roy, Jerome Simeon. "From XML Schema to Relations: A Cost-Based Approach to XML Storage," icde, p. 0064, 18th International Conference on Data Engineering (ICDE'02), Feb. 26-Mar. 1, 2002.*
Florescu and Kossmann, "A Performance Evaluation of Alternative Mapping Schemes for Storing XML Data In a Relational Database," INRIA Rocquencourt, May 1999, 31 pages.
Bohannon et al., "From XML Schema to Relations: A Cost-Based Approach to XML Storage", 28 pages.
Deutsch, Fernandez and Suciu, "Storing Semistructured Data with STORED", SIGMOD 1999, pp. 431-442.
Shanmugasundaram et al, "Relational Databases for Querying XML Documents: Limitations and Opportunities", Proceedings of the 25th VLDB Conference, 1999, pp. 302-314.

* cited by examiner

*Primary Examiner*—Tim T Vo
*Assistant Examiner*—Sangwoo Ahn
(74) *Attorney, Agent, or Firm*—Lee & Hayes, PLLC

(57) ABSTRACT

In one aspect, this disclosure relates to a method and associated apparatus that allows a user to obtain a semi-structured data input and a workload input. An improved semi-structured data storage schema is selected for a relational schema in response to the semi-structured data input and the workload input. The semi-structured data is segmented based on the selected improved semi-structured data storage schema. In one aspect, the semi-structured data is XML data.

9 Claims, 9 Drawing Sheets

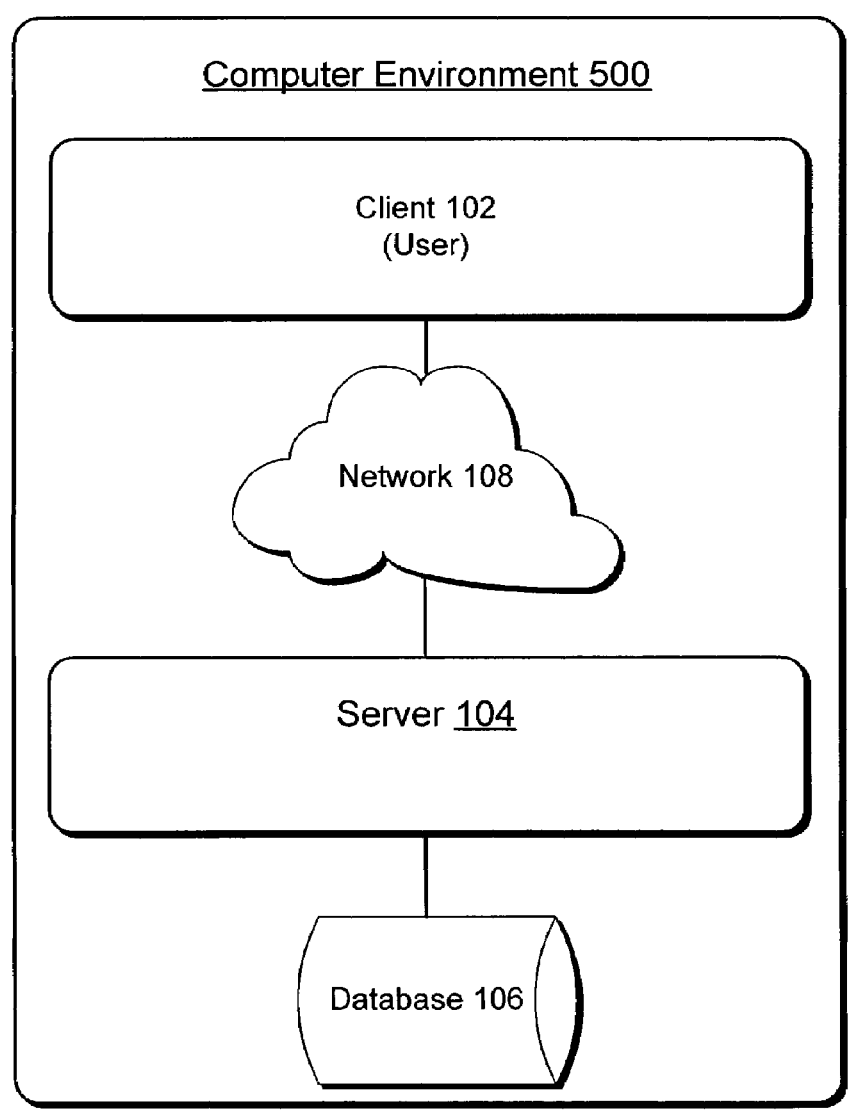

SEMI-STRUCTURED DATA STORAGE SCHEMA SELECTION

TECHNICAL FIELD

This disclosure relates to semi-structured data, and more particularly to selection schemas for storing semi-structured data within relational databases.

BACKGROUND OF THE INVENTION

Issues of storing and querying XML data, and other semi-structured data, have been studied extensively recently. Although there are efforts to build a repository for semi-structured data on object-oriented database systems or "native" structured language systems. Storing and querying the semi-structured data over relational database management systems (RDBMS) is becoming a common practice pursued by both researchers and database vendors.

There are typically several options of how to map semi-structured data stored in a particular configuration into relational databases. Much work for storing semi-structured data in relational database systems have provided various solutions for mapping the semi-structured data into relational tables (either by storing the semi-structured data in relational databases by a specific mapping approach using a fixed mapping method, or by leaving the user to specify the mapping schema). However, those approaches may not generate an efficient semi-structured data storage for an expected set of queries, and as such typically result in low performance for arbitrary semi-structured data and workload. Thus, it would be beneficial to provide a way to improve mapping of the semi-structured data into relational databases.

SUMMARY OF THE INVENTION

This disclosure relates generally to a semi-structured data storage schema selector for semi-structured (e.g., XML) data. In one aspect, this disclosure relates to a method and associated apparatus that allows a user to obtain a semi-structured data and workload input. An improved semi-structured storage schema is selected for data to be mapped to a relational schema in response to the semi-structured data and the workload input. In certain aspects, the semi-structured data is segmented based on the selected semi-structured data storage schema in a manner that can be efficiently stored in a relational database. In one aspect, the semi-structured data is XML data.

BRIEF DESCRIPTION OF THE DRAWINGS

FIG. 1a is a block diagram of one embodiment of a semi-structured data storage schema selector;

FIG. 1b is a block diagram of one embodiment of a networked computer configuration that can include another embodiment of semi-structured data storage schema selector from that shown in FIG. 1a;

FIG. 1c is a block diagram of one embodiment of a stand-alone computer configuration that can include the semi-structured data storage schema selector shown in FIG. 1a;

DETAILED DESCRIPTION

Figure 1C:
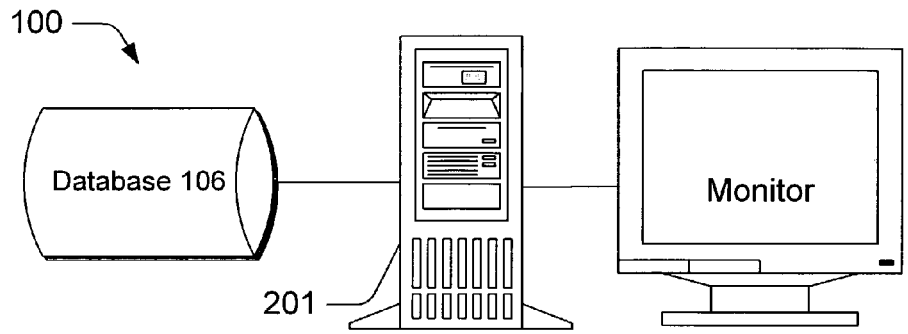

Extensible Markup Language [XML] represents one embodiment of semi-structured computer program. If it is desired to store certain embodiments of semi-structured data (such as extensible Markup Language [XML] data) within a relational database, a semi-structured data storage schema should be matched to that relational schema. The semi-structured data storage schema is considered as a data structure that can store the semi-structured data within a relational database. One aspect of this disclosure provides a mechanism to select a relational schema for storing the semi-structured data.

FIG. 1a illustrates a block diagram of one embodiment of semi-structured data storage schema selector 100 that is in communication with such a data storage device 101 as the relational database. In this disclosure, XML data is considered one embodiment of semi-structured data. The semi-structured data storage schema selector 100 segments the semi-structured data in a manner by which the segmented semi-structured data can be stored in the relational database. This disclosure describes different embodiments of the cost driven semi-structured data storage schema selector 100.

Certain embodiments of databases use a manual method to perform this mapping methods. Certain embodiments of the cost driven semi-structured data storage schema selection for semi-structured data, as described within this disclosure, provide a mechanism for finding the mapping of the semi-structured data to the relational database. Some of these embodiments automatically determine a relational schema for storing the semi-structured data (such as is included in XML documents).

The semi-structured data (such as stored in a specific semi-structured [e.g., XML] tree) can be partitioned or segmented into a variety of segments to allow that semi-structured data to be stored in a relational database. The semi-structured data can be segmented in many different configurations and it is difficult to determine which segmentation configuration provides the most effective segmentation, storage, and retrieval of the semi-structured data. Each segment containing segmented semi-structured data can be stored into a relational table in the relational database. Certain embodiments of the cost driven semi-structured data storage schema selection for semi-structured data provide an improved segmentation algorithm that reduces the cost of the queries applied against the semi-structured data.

Different embodiments of hillclimbing algorithm as described in this disclosure produce an effective technique for the segmentation of the semi-structured data such as XML. The hillclimbing algorithm does not seek to find the global optimal solution for segmentation, but instead finds a local maximum solution. Using the local maximum solution for the segmentation of the semi-structured data improves the effectiveness of the hillclimbing algorithm compared to finding a global optimal solution. Additionally, the computational time to run the embodiments of hillclimbing algorithm is relatively low since a relatively low number of solutions have to be considered, computed, and derived to obtain the local maximum solution. Since the hillclimbing algorithms described herein run faster than those algorithms that find a globally optimum solution, the necessary time to find an improved relational database storage schema for storing semi-structured data is reduced.

The semi-structured data storage schema selector 100 automatically selects an improved method for storing semi-structured documents (such as XML documents) in a relational database. Examples of relational databases include structured query language (SQL) databases. The semi-structured data storage schema selector method efficiently and accurately responds to queries made against the semi-structured documents stored in the relational database.

Certain embodiments of the semi-structured data storage schema selector 100 automatically generate a set of semi-structured data storage schema candidates. A cost model is developed to estimate a query execution cost for each candidate semi-structured data storage schema. A hill climbing algorithm "selects" the semi-structured data storage schema (or provides enough information over a user interface for the user to select the semi-structured data storage schema) according to the computed costs.

Traditionally, search engines locate relevant electronic documents, files, etc. (hereinafter "documents") based on one or more search terms or words provided by a user. The efficiency of retrieving the semi-structured documents is associated with the manner in which the documents are stored. Standard Generalized Markup Language (SGML) and XML are examples of semi-structured computer languages that produce semi-structured documents containing semi-structured data. Semi-structured data in XML documents, for example, is characterized based on the tags that define the content, the structure, and the appearance of the documents. Data is arranged in semi-structured documents in a hierarchical structure (such as a tree or linked list), and as such the documents are particularly suited for meaningful semi-structured data storage schema selection. The cost driven semi-structured data storage schema selector 100 can store structured documents having a suitable granularity that can be utilized by the users.

The semi-structured data storage schema selector 100 can also select a semi-structured schema for Hypertext Markup Language (HTML) documents, provided the HTML is configured with a semi-structured data storage schema that can store data in a hierarchical or other semi-structured fashion. HTML data does not necessarily need a semi-structured data storage schema to store data, so some transformation may be necessary to convert existing HTML schemas into semi-structured data.

One aspect of this disclosure describes different embodiments of the semi-structured data storage schema selector 100 that can efficiently select a good storage schema for semi-structured data (such as contained in semi-structured documents). FIG. 1b illustrates one embodiment of the (network-based) computer environment 500 including a client portion 102, a server portion 104, a database portion 106, and a network portion 108. The computer environment 500 includes the semi-structured data storage schema selector 100 as illustrated in FIG. 1a. The client portion 102 and the server portion 104 interface over the network portion 108 using standard network communication protocols to transfer data there between. System calls are typically transferred over the network portion 108 during the process of data transfer. During normal operation, the server portion 104 accesses data from the database portion 106. The semi-structured data storage schema selector 100 searches documents stored in the database 106 based on certain search terms contained in the query from the user (at the client portion 102).

The FIG. 1c embodiment of the semi-structured data storage schema selector 100 runs on a stand-alone computer 201. The stand-alone computer includes the database portion 106 (the database portion may be, or may not be, integrated within the stand-alone computer). The stand-alone computer 201 described relative to FIG. 1c can store semi-structured documents in the database portion 106 in a similar manner to the combined client portion 102, server portion 104, and network portion 108 as shown in FIG. 1b. As such, the database portion 106 can utilize the semi-structured data storage schema selector 100 as illustrated in FIG. 1a in either a stand-alone computer as shown in FIG. 1c or a network system as shown in FIG. 1b. While the database portion 106 is shown as a separate component from the network or the stand-alone computer shown respectively in FIGS. 1c and 1b, in reality the database portion may be integrated within the respective network or stand-alone computer. Further details of the computer environment and structure such as may be associated with the semi-structured data storage schema selector 100 are described herein relative to FIG. 10.

In different embodiments, the database portion 106 stores semi-structured documents containing semi-structured data storage schema data in such semi-structured formats as XML, HyperText Markup Language (HTML), or SGML. HTML is the markup language presently predominantly used over the Internet, and typically has its own schema. HTML is most commonly used to define such display aspects as color, font, etc. that is displayed on computer displays. It is more difficult to use HTML for queries of semi-structured data storage schema data in many embodiments of the semi-structured data storage schema selector 100 than, for example, XML and SGML because HTML has been traditionally focused on displaying the style, not the content of the displayed data. XML and SGML, by comparison, are user defined, and are primarily concerned in the data content of the documents (at which the semi-structured data storage schema selector 100 is directed). As such, HTML, XML, SGML, or other semi-structured computer languages) can be applied to different embodiments of the cost driven semi-structured data storage schema selector 100, though XML and SGML are particularly suited. There are other embodiments of markup languages and other structured computer languages that are within the intended scope of the semi-structured computer languages that can contain data to be segmented by the semi-structured data storage schema selector 100, as described in the present disclosure.

The term "schema" pertains to the structure of the data. XML is an example of a computer language that can be used to provide the semi-structured data storage schema. Providing a mechanism to improve the selection of the semi-structured data storage schema is desired to efficiently and accurately respond to queries. Since eXtensible markup language (XML) is configured to define data in a semi-structured manner using tags, the term "XML data" is considered as one embodiment of "semi-structured data". Describing XML data as semi-structured data is illustrative and not limiting in scope, since other protocols provide semi-structured data as well. Certain other semi-structured computer languages are, in fact, descended from XML, while other semi-structured computer languages have been developed independently.

Figure 2:
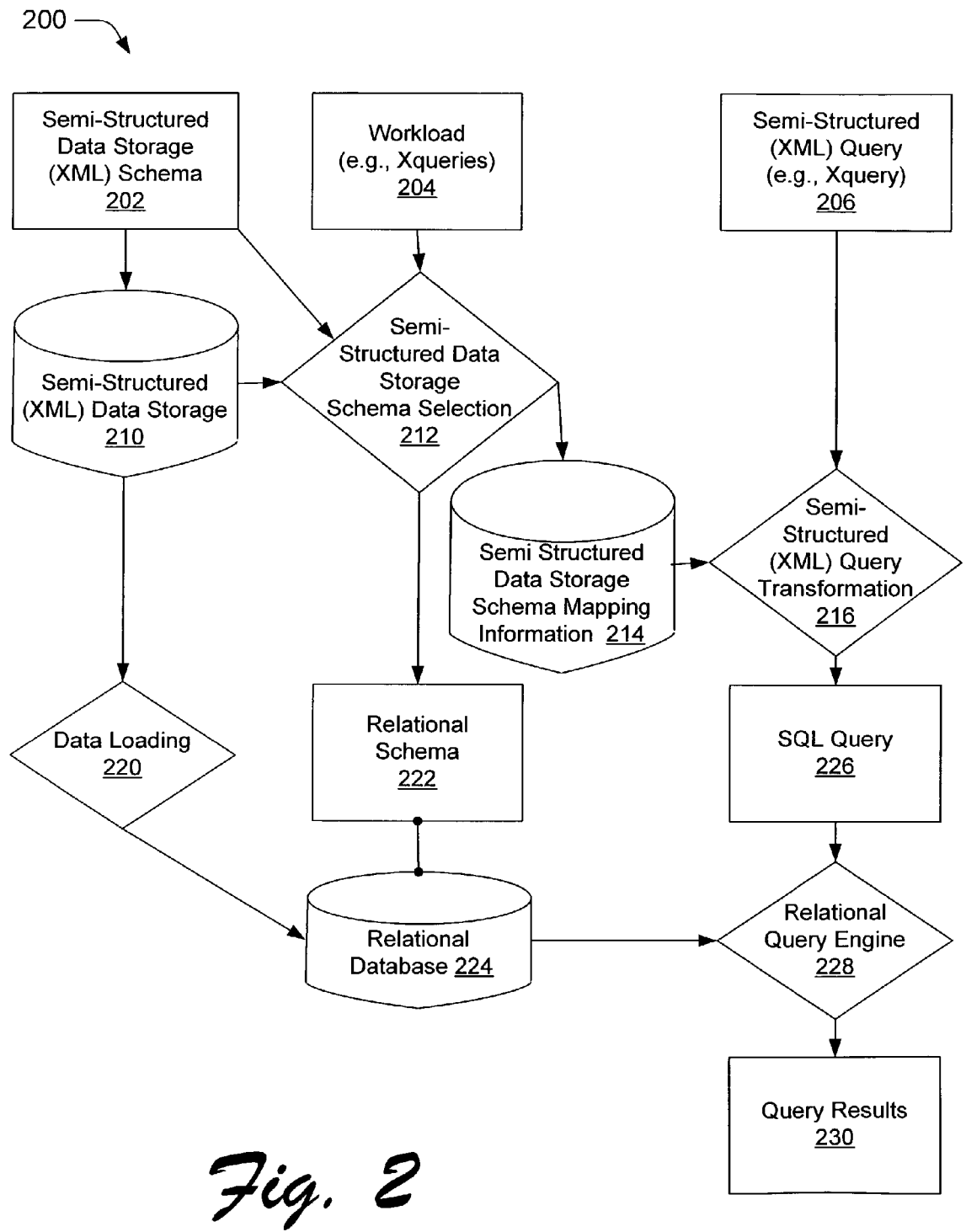
FIG. 2 is a flow chart for one embodiment of a semi-structured data storage schema selection tool.

The semi-structured data storage schema selector 100 includes a semi-structured data storage schema data flow 200 as illustrated in FIG. 2 as described herein. This disclosure describes multiple embodiments of a semi-structured data storage schema data flow 200 included within the semi-structured data storage schema selector 100 that automatically selects the semi-structured data storage schema for use with a relational database.

One embodiment of the semi-structured data storage schema data flow 200 as described relative to FIG. 2 includes a semi-structured (e.g., XML) data storage schema portion 202, a workload portion 204, a structured (XML) query portion 206, a semi-structured (XML) data storage portion 210, a semi-structured data storage schema selection portion 212, a semi-structured data storage schema mapping information portion 214, a structured (XML) query transformation portion 216, a data loading portion 220, a relational schema portion 222, a relational database portion 224, a structured query language (SQL) query portion 226, a relational query engine portion 228, and a query results portion 230. Using the semi-structured data storage schema data flow 200, the semi-structured data storage schema selector 100 can partition each tree of the semi-structured data into segments. Each segment is then stored in one table in the relational database. The workload from the workload portion 204 is then applied against the relational database 224.

The semi-structured (XML) data storage schema portion 202 provides the structure, or schema, to the semi-structured (XML) data storage portion 210. The semi-structured data storage schema portion 202, the workload portion 204, and the semi-structured data storage portion 210 together provide input to the semi-structured data storage schema selection portion 212 by which the semi-structured data storage schema selection portion 212 selects the proper semi-structured data storage schema. The workload portion 204 indicates to the semi-structured data storage schema selection portion 212 the workload to which the semi-structured data storage schema data flow 200 is exposed. The workload portion 204 includes data made up of some XML queries and the XML query transformations. The workload portion 204 is one of the inputs to the semi-structured data storage schema selection 212. The semi-structured data storage portion 210 stores semi-structured data such as documents. The semi-structured data storage schema selection portion 212 selects which semi-structured data storage schema to select in the semi-structured data storage schema data flow 200.

The data loading portion 220 loads data (e.g., documents) from the semi-structured data storage portion 210 into the relational database 224. As such the relational database portion 224 stores the semi-structured data from the semi-structured data storage portion 210. The semi-structured data storage schema selection portion 212 indicates to the relational schema portion 222 the selected semi-structured data storage schema. The relational schema portion 222 determines the schema of the relational database portion 224. Based on the semi-structured data storage schema selection portion 212, the semi-structured data storage schema mapping information portion 214 provides the selected mapped information to the structured query transformation portion 216 by which the latter can apply the proper transformation. The structured query transformation portion 216 transforms the query from the structured (XML) query portion 206 to create the proper selected SQL query portion 226.

The relational query engine portion 228 applies the query to the data contained in the relational database portion 224 based on the query derived by the SQL query portion 226. The SQL query portion 226 provides its query results to the relational query engine 228.

During operation, a user should provide two inputs to the semi-structured data storage schema data flow 200. The first input is data supplied to the semi-structured XML data storage schema 202 that is stored in the semi-structured (XML) data storage portion 210. The second input is based on the workload portion 204 that includes some structured queries. The workload input can be derived based on the cost formula value provided by the equations 13 and/or 14, as described herein. These two inputs can be used by the semi-structured data storage schema selection portion 212. The semi-structured data storage schema data flow 200 uses these two inputs and produces the improved relational schema in which the semi-structured data can then be stored in the relational database according to the relational schema.

The semi-structured data storage schema data flow 200 can be run once as an off-line tool. This can be run, for example, when the developer is initially setting up the mapping. In other embodiments, the semi-structured data storage schema data flow 200 can be updated using new data based on an adaptive, or some other, algorithm. Some improvement to the operation of the semi-structured data storage schema data flow is provided by tracking the data, and evaluating the data after some prescribed duration.

Figure 10:
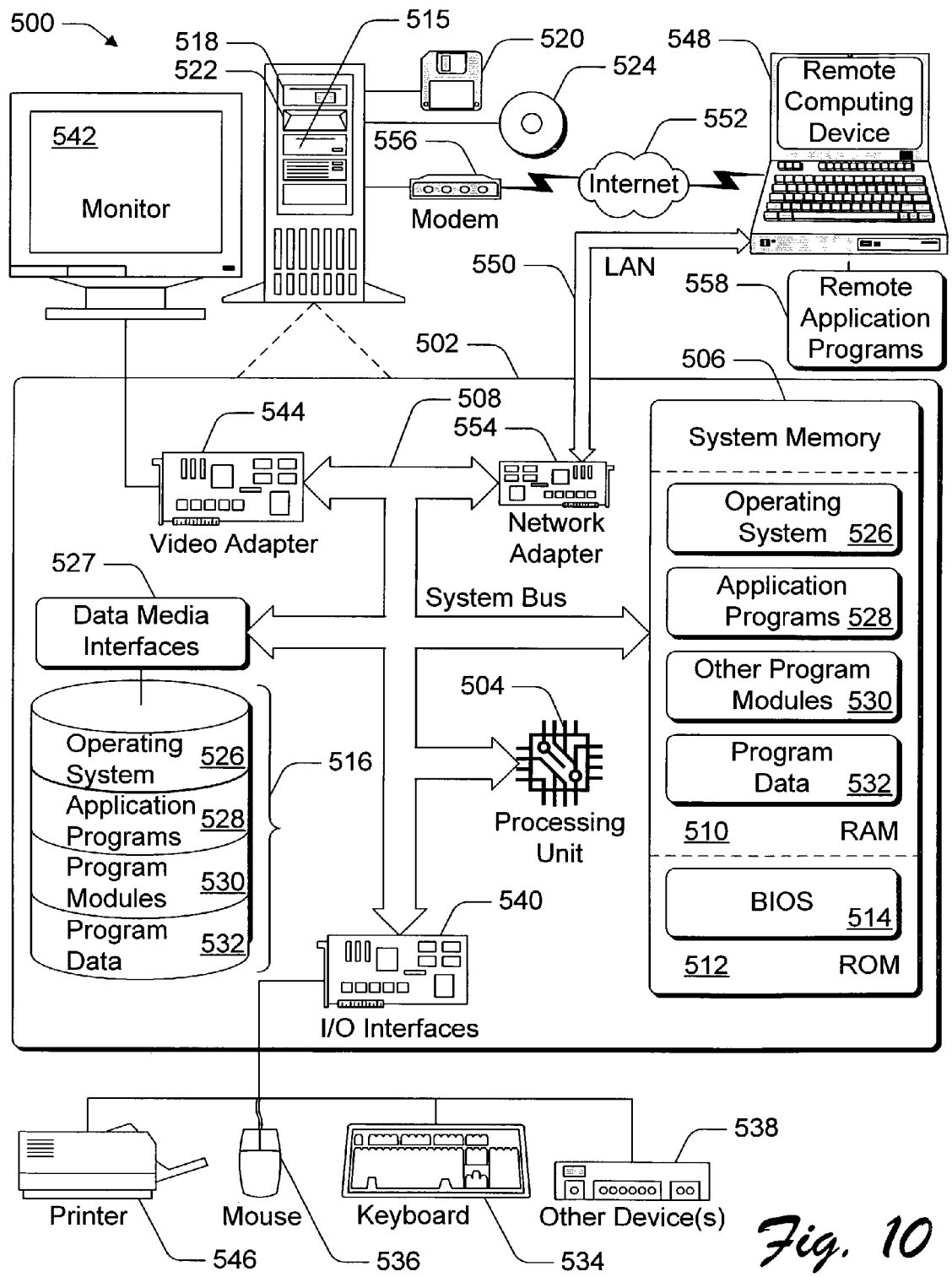
FIG. 10 illustrates one embodiment of computer environment that can contain a semi-structured data storage schema selector and a relational database.
Figure 12:
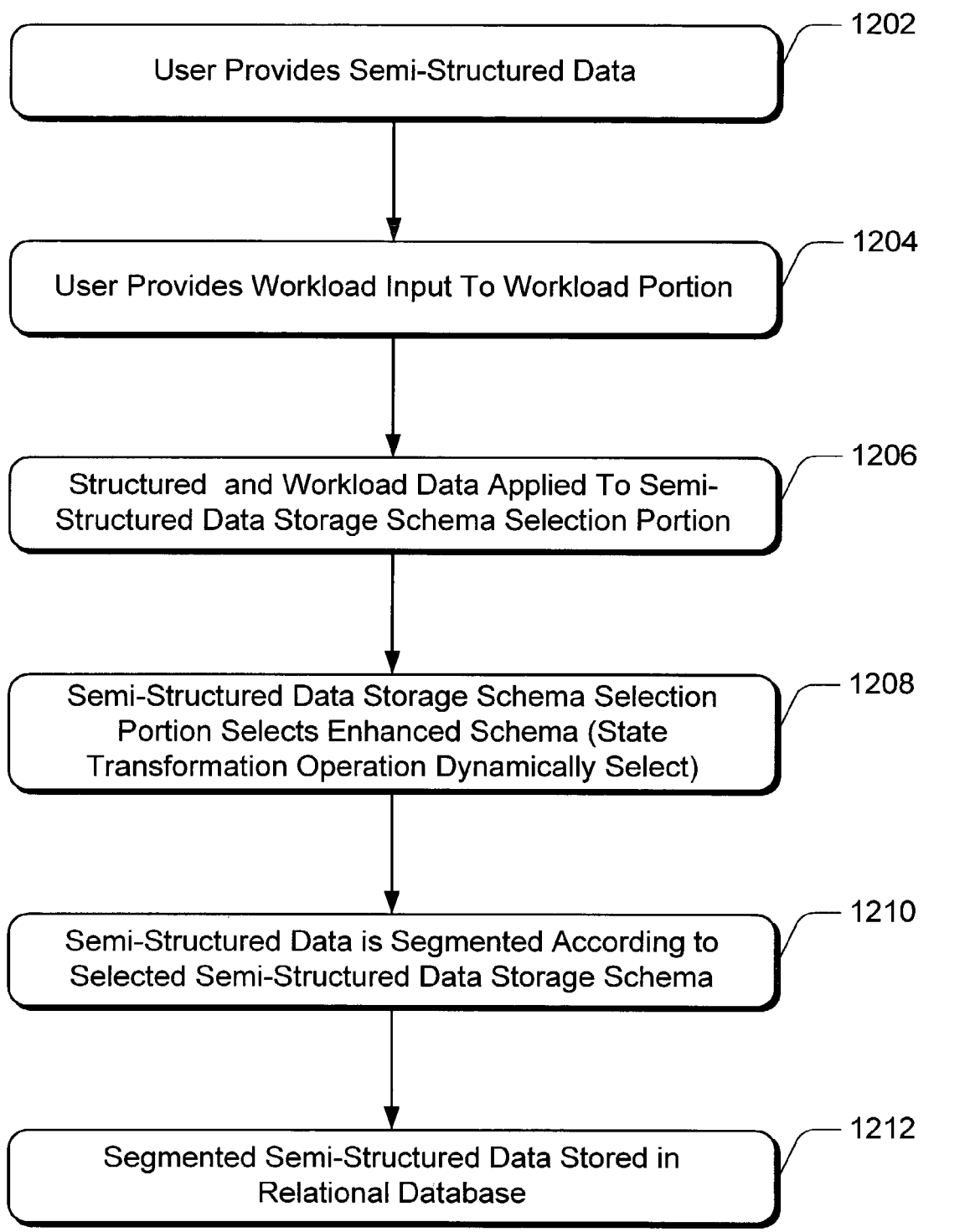
FIG. 12 illustrates one embodiment of semi-structured data storage schema as provided by the semi-structured data storage schema data flow illustrated in FIG. 2.

One embodiment of process 1200 that is performed by the semi-structured data storage schema data flow 200 is illustrated in FIG. 12, using the computer environment 500 as illustrated in FIG. 10. The process 1200 includes 1202 in which the user provides the semi-structured data that can be stored into the semi-structured data storage portion 210 as illustrated in FIG. 2. In 1204, the user provides the workload input to the workload portion 204.

In 1206, the semi-structured data and the workload data are input to the semi-structured data storage schema selection portion 212 as illustrated in FIG. 2. The semi-structured data storage schema selection portion 212 selects the improved semi-structured data storage schema based on the workload data and the semi-structured data in 1208. In 1210, the semi-structured data is segmented according to the selected improved semi-structured data storage schema.

In 1212, the segmented semi-structured data is stored in the relational database 224 according to the relational schema 222 illustrated in FIG. 2. The process 1200 illustrated in FIG. 12 thereby provides the generalized operation of the, semi-structured data storage schema data flow 200 as illustrated in FIG. 2.

The semi-structured data storage schema mapping information 214 describes how to map the semi-structured data storage schema into the relational schema. When a new user structured XML query 206 comes in, the semi-structured data storage schema mapping information can be used to transform the query into a SQL query 226. This SQL query 226 can be applied to a relational query engine 228 associated with a relational database 224 that yields the query results.

The semi-structured data storage schema data flow 200 can automatically select a good semi-structured data storage schema for semi-structured data, and is very useful in developing the potential of relational database applications. This disclosure provides a technique to select the improved semi-structured data storage schema for the semi-structured data automatically. In particular, the semi-structured data storage schema data flow 200 searches for the improved semi-structured data storage schema of structured documents when provided with an expected workload. The semi-structured data storage schema data flow 200 only explores part of the search space to find a good semi-structured data storage schema solution in a reasonable time. In the hillclimbing algorithm, a set of transformation operations are proposed and efficient heuristics are developed to reduce the search space. Certain aspects of the semi-structured data storage schema selection portion of the present disclosure are directed at the following:

1) The semi-structured data storage schema selection of the semi-structured data is examined within the semi-structured data storage schema data flow 200. The disclosed embodiments of the hillclimbing algorithm drive the semi-structured data storage schema selection process based on a cost model for queries of the structured document (e.g., using XQuery) with path expressions.

2) Two efficient hillclimbing techniques are provided in this disclosure. One technique reduces the attempt state incurred during hillclimbing, while the other reduces the unnecessary cost estimation. These two techniques significantly reduce the running time of the hillclimbing algorithm. The storage strategy can be selected in a reasonable time because of the reduced complexity of the hillclimbing algorithm. The hillclimbing algorithm searches for the improved semi-structured data storage schema according to the costs. Two embodiments of hillclimbing algorithm further speed up the semi-structured data storage schema selection as described herein: the candidate neighboring states technique and the delta query technique.

3) A system for automatically selecting a good semi-structured data storage schema is implemented and tested. Experimental results have been provided over various semi-structured data types and a range of workloads, including those experimental results that are based on the XML benchmark. The results show that the embodiments of the semi-structured data storage schema systems described herein are efficient and can make good selections that significantly outperform other semi-structured data storage strategies.

Figure 3:
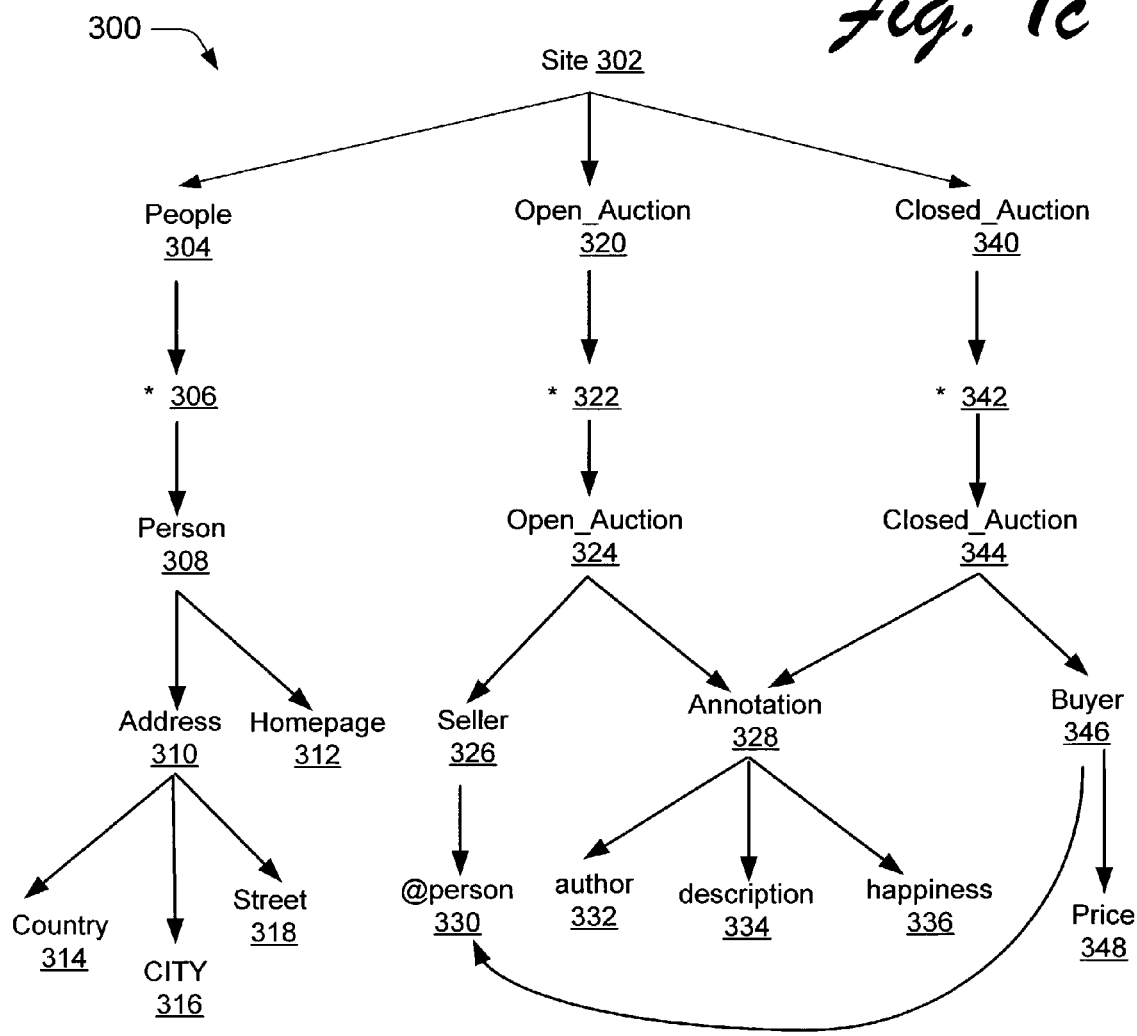
FIG. 3 illustrates one embodiment of a semi-structured (e.g., XML) data storage schema graph.

One embodiment of a directed labeled graph that is referred to as a schema graph 300 is illustrated in FIG. 3. The schema, or Document Type Definitions (DTD) of a semi-structured (i.e., XML) document is modeled as the schema graph 300. XML provides an application-independent way of sharing data. DTDs are useful for structured documents so independent groups of people can use a common DTD for interchanging semi-structured data. A user can use a standard DTD to verify that data that they have received from another source is valid, or to verify their own data.

The embodiment of the schema graph 300 illustrated in FIG. 3 represents an auction Web site. In the schema graph 300, the nodes 302, 304, 306, 308, 310, 312, 314, 316, 318, 320, 322, 324, 326, 328, 330, 332, 334, 336, 340, 342, 344, 346, and 348 represent elements, attributes, or relationships between two element nodes. A plurality of relationship nodes are each illustrated in FIG. 3 by the "*" nodes 306, 322, and 342 in the semi-structured data storage schema of semi-structured (i.e., XML) documents.

The schema graph 300 can be arbitrarily mapped into relational schemas. On one extreme, the elements of schema graphs 300 can be stored using as few relations (tables in the relational database) as possible. In these instances, those elements, and all of the descents of those elements, that are not truncated by the * node are stored as a single distinct relation. In another extreme, the elements of schema graphs 300 can be stored using a larger number of relations such that, for example, each element (attribute) in the schema graph 300 can be mapped as a separate relation.

Those embodiments of the schema graph 300 that models the same situation with fewer relations (compared to those schema graphs that model the same situation with more relations), have fewer element fragments and can reduce the number of joins between relations. However, for a particular set of queries, the schema graph 300 with fewer relations may represent an inefficient semi-structured data storage strategy. For example, Table 1 illustrates a mapping example which corresponds to the schema graph 300 in FIG. 3 in which four relations are mapped: site 302, person 304, Open_auction 320, and closed auction 340.

TABLE 1 a mapping example relating to the schema graph 300 of FIG. 3.

Site: (siteID:integer, site.parentID:integer, site.people:integer, site.openauctions:integer, site.closed_auctions:integer).
Person: (personID:integer, person.parentID:integer, person.address:integer, person.address.country:string, person.address.city:string, person.address.street:string, person.homepage:string).
Open_auction: (open_auctioned:integer, open_auction.parented:integer, open_auction.seller:string, open_auction.seller.@person:string, open_auction.annotation:integer, open_auction.annotation.author:string, open_auction.annotation.happiness:string, open_auction.annotation.description:integer).
Closed_auction: (closed_auctioned:integer, closed_auction.parented:integer, closed_auction.price:string, closed_auction.buyer:string, closed_auction.buyer.@person:string, closed_auction.annotation:integer, open_auction.annotation.author:string, open_auction.annotation.happiness:string, open_auction.annotation.description:integer ).

Consider the query listed in Table 2 that lists the names of persons and the number of items they bought based on the schema graph 300 shown in FIG. 3:

TABLE 2

Query List Pseudocode.

FOR $p IN document("auction.xml")/site/people/person
LET $a:=FOR $t INdocument("auction.xml")/site/closed_auctions/closed_auction
WHERE $t/buyer/@person = $p/@id
RETURN $t
RETURN <item person=$p/name/text()> COUNT ($a) </item>

This query joins three relations: site, person and closed_auction. Only a small part of attributes in those three relations are used to answer the query. One semi-structured data storage schema for this query is to store only the correlative attributes of the entire query in one relation. Another embodiment of storing semi-structured data storage schema may involve storing the elements accessed by each query as a separate query. This semi-structured data storage schema does not yield as the improved results of some other embodiments since usually the * edges make this strategy infeasible. The special node, *, indicates a 1:n relationship between the nodes at the two ends of the * node. Since certain embodiments of the Relational Database Management System (RDBMS) does not support attributes with set values, the nodes at the two ends of the * node have to be mapped into separate relations. While such a strategy would lead to more semi-structured data storage and update costs, this does not scale well to the size of workload. An experienced user may be able to develop a good semi-structured data storage schema for a set of small structured documents and a workload with only a few queries. However, designing an improved semi-structured data storage schema for a large set of structured documents and workload is still a difficult problem even for professional users or database administrators. Thus, a tool that can automatically select a good semi-structured data storage schema for a set of structured documents and a workload is critical for the query processing performance of the structured documents.

Consider that a workload is characterized by a set of pairs as described in equation 1 to describe one embodiment of deriving a cost efficient structured semi-structured data storage schema:

$$W=\{(Q_i, w_i), i=1, 2, \ldots, n\} \quad (1)$$

Where $Q_i$ is an XQuery statement expected to occur over a specified time period, and $w_i$ is its corresponding weight. The cost of a workload W against a semi-structured data storage schema S is the weighted sum of the estimated cost of the queries in the workload as per equation 2:

$$\text{Cost}(W, S) = \sum_{i=1}^{n} W_i * \text{Cost}(Q_i, S) \quad (2)$$

The semi-structured data storage schema selection problem can be specified as: given a set of structured documents, and a workload W, find the improved semi-structured data storage schema S of those structured documents in a relational database, such that the Cost(W, S) is decreased (to a significantly reduced level).

This semi-structured data storage schema selection problem can be transferred into an equivalent graph partition problem. The problem of improved graph partition is not desirable since it is so processor-intensive and time consuming. Thus, conducting an exhausting search to find an optimal solution is impractical. Therefore, this disclosure describes how to use a hillclimbing algorithm that only explores a part of the search space to provide improved semi-structured data storage schemas for the semi-structured data.

The hillclimbing algorithm is a scalable algorithm that efficiently solves the semi-structured data storage schema solution problem. The hillclimbing algorithm can be considered as a local maximization program. Certain hillclimbing algorithms used by the semi-structured data storage schema data flow 200 can provide the local maximum state in the search space within a reasonable time. In this section, the structure of several embodiments of the hillclimbing algorithm are described. Additionally, three important aspects of the hillclimbing algorithm as applied to the semi-structured data storage schema selection problem (e.g., using XML) are described. These aspects include an initial state selection, a state transformation, and an estimation of the cost of workload.

In general, the hillclimbing algorithm works by determining whether the cost of the new state is smaller than the cost of the current state. If so, then the current state is set to the new state. If the cost of the new state is larger than the current state, then current state is maintained. As such, the cost to run a typical query is reduced based on the yielded semi-structured data storage schema.

The structure of a structured document (i.e. the DTD or XML semi-structured data storage schema) is modeled as a schema graph 300 as illustrated in FIG. 3. A directed, labeled, schema graph (G) 300 is defined in equation 3 as:

$$G=(V, E, \Sigma v, lab, id) \quad (3)$$

Where
1. V is a finite set of nodes;
2. $E \subseteq V \times V$, which is a set of edges;
3. $\Sigma_V = \text{ele} \cup \text{attr} \cup \{\#PCDATA\} \cup \{*\}$, where "ele" is an element, "attr" is an attribute, and PCDATA is data that is being stored, and "*" represents the relationship between a plurality of nodes. There are a finite set of symbols with this equation;
4. lab is a mapping $V \to \Sigma_V$, which assigns a label to each node in V. The node can be an element if $lab(V) \in ele$; the node can be an attribute if $lab(V) \in attr$; the node can be a text content if $lab(V)=\#PCDATA$; or the node can be a star if $lab(V)=*$.
5. id is a mapping that assigns a unique identifier for each node.

An annotation for each node in the schema graph 300 is provided when mapping a schema graph 300 into relational schemas. A schema graph 300 with annotations is called an annotated schema graph. A directed, labeled graph G, as specified in equation 3, is an annotated schema graph, if the following four conditions are met:
1. G is a schema graph;
2. Each node $v \in V$ has an annotation set (f, size(v), type, AQ), where
    a) f is a mapping that assigns a relation so that v is inlined into to node v;
    b) size(v) is the number of instances of element v in the XML document;
    c) type={string, int} is the semi-structured data storage type for the node v;
    d) AQ is the set of queries that access v, that is, $AQ(v) = \{Q|Q \text{ access node } v\}$.

Only the schema graph 300 is used instead of an annotated schema graph, but it is envisioned that both could be used while remaining within the scope of the present disclosure. The set of instances of a schema graph 300 correspond to the set of documents conforming to that schema graph. A set of instances of a schema graph G 300 is also called the extend of G, which is denoted as ext(G) in equation 4:

$$\text{ext}(G)=\{D|D \text{ is the structured (for example XML)} \\ \text{documents conforming to } G\} \quad (4)$$

A connected subgraph of schema graph G 300 is called a fragment, denoted as $f=(v_1, v_2, \ldots, v_m)$, where $v_i$ is a node in f. The extend of a fragment is all of the instance fragments conforming to the fragment. As such, two fragments $f_1$ and $f_2$ are neighboring if $f_1 \cap f_2 = \phi$ and there is an edge (u, v) connecting $f_1$ to $f_2$, i.e. $u \in f_1$, $v \in f_2$. Two fragments $f_1$ and $f_2$ are twin, if:
1) $\text{ext}(f_1) \cap \text{ext}(f_2)=\phi$;
2) for each node $u \in f_1$, there is a node $v \in f_2$, such that $lab(v)=lab(u)$;
3) for each node $v \in f_2$, there is a node $u \in f_1$, such that $lab(u)=lab(v)$.

A partition S on an annotated schema graph G 300 is called a "mapping state", or a "state", if S=($f_1$, $f_2$, ..., $f_n$), where $f_i$ is a fragment in G, such that $$S = \bigcup_{i=1}^{n} f_i$$

and for any two fragments $f_i$ and $f_j$, if i≠j, $f_i \cap f_j = \phi$ holds. As an example, Table 3 shows a state on the schema graph 300 illustrated in FIG. 3.

TABLE 3

A Mapping State f = ( f1, f2, f3, f4).
  f1 = (site, site.people, site.open_auctions, site.closed_auctions).
  f2 = (person, person.address, person.address.country, person.address.city, person.address.street, person.homepage).
    f3=(open_auction, open_auction.seller, open_auction.seller.@person, open_auction.annotation, open_auction.annotation.author, open_auction.annotation.happiness, open_auction.annotation.description).
    f4=(closed_auction, closed_auction.price, closed_auction.buyer, closed_auction.buyer.@person, closed_auction.annotation, open_auction.annotation.author, open_auction.annotation.happiness, open_auction.annotation.description ).

TABLE 4

Algorithm

Given a fragment f={$v_1$, $v_2$, ..., $v_m$} in a state S, assume that the root in f is $v_1$, f can be mapped into a relation by a primitive mapping:
  R(Id($v_1$):integer,
  Id($v_1$.parentid):integer,
  lab($v_1$): type($v_1$), lab($v_2$): type($v_2$), ..., lab($v_m$):type($v_m$)).

where lab($v_i$) is the field name of $v_i$ in R, type($v_i$) is the type for the field. If $v_i$ is a leaf node, its type is string. If $v_i$ is not a leaf node, its type is integer. For example, the relations corresponding to $f_1$ and $f_2$ in Table 3 are Site and Person in Table 1.

Consider that a state is a solution to the semi-structured data storage schema selection problem. All of the possible partitions on the schema graph 300 consist of the whole solution space. Thus, the goal of semi-structured data storage schema selection is to find an improved solution in the state space, which decreases the cost of running the workload.

One embodiment of the hillclimbing algorithm is shown in Table 5. First, an initial state is selected as the beginning point and is the initial current state. Then the state is transformed to one of its neighboring states by employing one of the transformation operations. The cost of the new state is estimated and compared to the cost of current state. If the cost of the new state is lower than the current state, then the algorithm performs an uphill move to set the new state as the current state. As such, the cost to perform most queries (based on a local maximization program) is reduced. If the cost of the new state is higher than or equal to the current state, it is discarded and next unexplored neighboring state of the current state is selected for evaluation. This procedure is iterated until there is no further performance improvement. The improved state found in this iteration procedure is recorded and returned at last. The key components of the hillclimbing algorithm include:

1) Selecting the initial state;
2) Transforming a state into its neighboring state;
3) Estimating the cost of a query; and
4) Continuing this process until a local maximal value is derived (and the values surrounding the local maximum value are less than the local maximum).

Although the framework of hillclimbing algorithm is problem-independent, these components depend on the particular problem concerned. One embodiment of hillclimbing algorithm is illustrated in Table 5.

TABLE 5

Hillclimbing Algorithm Embodiment

Input: An initial state S, and workload data (W) where W
=(($w_1$,$Q_1$), ($w_2$,$Q_2$), ..., ($w_1$,$Q_m$)).
  Output: an improved state that has the reduced cost.
  $S_0$= an initial state {$f_1$, $f_2$, ..., $f_n$};
  While N($S_0$) ≠ φ do
    S= a neighbor state of $S_0$;
    Δc=Cost(W, $S_0$)–Cost(W, S);
    If Δc>0 then
      $S_0$=S;
    Else
      N($S_0$)= N($S_0$)– S;
  return($S_0$);

To select an initial state, the following procedure is followed. The selection of the initial state appears important for the efficiency of many embodiments of the hillclimbing algorithm, but not for all of the cases. Selecting the initial state does affect the running time of the algorithm, but has nearly no impact on the quality of the resulting semi-structured data storage schema if a reasonable starting point (such as are provided by the Shared-Inline algorithm or the Hybrid_Inline algorithm) is chosen.

Figure 11:
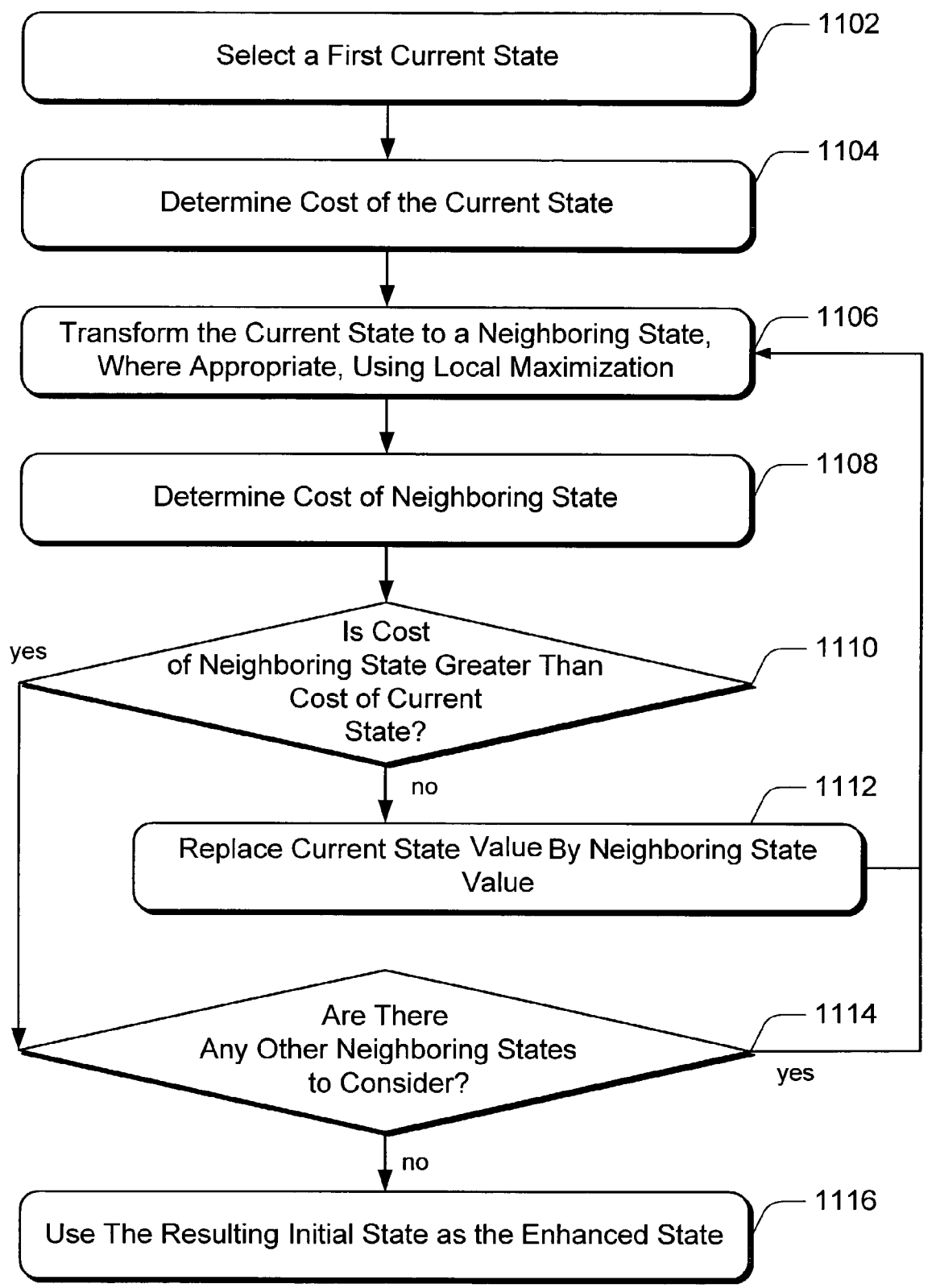
FIG. 11 illustrates one embodiment of hillclimbing algorithm.

One embodiment of hillclimbing algorithm 1100 is illustrated in FIG. 11 that can be performed by an embodiment of computer environment 500 as illustrated in FIG. 10. The hillclimbing algorithm of FIG. 11 can be considered as providing a local maximum value in which the cost of running typical queries is minimized. The hillclimbing algorithm 1100 includes 1102 in which a first current state is determined. The hillclimbing algorithm 1100 continues to 1104 in which the cost of the current state is determined. The hillclimbing state is an iterative process, and as such, the current states are modified based on finding other neighboring states in which the cost is lesser than the current state.

In 1106, the hillclimbing algorithm 1100 transforms the current state into a neighboring state. In 1108, the cost of the neighboring state is determined. The selection of the direction and distance from the current state to the neighboring state is somewhat random. One technique may be to provide a neighboring state in close proximity to the current state. The size of the processor, and the amount of computation necessary to determine the costs of the neighboring states may determine the total number of neighboring states to be determined.

In decision 1110, it is determined whether the cost of the neighboring state as determined in 1108 is greater than the cost of the current state as determined in 1104. If the answer to the decision 1110 is no, then the hillclimbing algorithm 1100 continues to 1114, and the neighboring state in effect becomes the new current state in an iterative fashion, and the hillclimbing algorithm returns to 1106.

If the answer to decision 1110 is yes, then the hillclimbing algorithm continues to decision 1114 in which it is determined whether there are any further neighboring states to consider. If the answer to the decision 1114 is yes, then the hillclimbing algorithm continues to 1106 as described above. If the hillclimbing algorithm follows this route, however, then the value of the current state is maintained while the neighboring state is discarded (which is opposed to the logic of decision 1110).

The decision 1114 can be determined either by user input, or some automatic function. For instance, the hillclimbing algorithm 1100 can continue searching for neighboring states for a given current state (where the cost of the neighboring states are greater than the cost of the most recent current state) in an iterative manner by "circling" the current state with neighboring states. As soon as the algorithm is satisfied that a sufficient number of neighboring states have been considered and tested (either automatically or under control of the user), then the hillclimbing algorithm is terminated and the last-used initial state is used as an improved state in 1116. The improved state that results in 1116 may be considered as a local maximum value for the iterative hillclimbing algorithm.

There are modifications of the hillclimbing algorithm that are intended to be within the scope of the present disclosure. For example, instead of using a local maximum value, another value in close proximity to the local maximum can be used. Additionally, instead of using a single current state from which a local maximum is iteratively derived, a prescribed number of current states can be used. A local maximum value can be derived from each initial state. Optionally, the maximum local value from all of the values can be used as the final local maximum value.

A state consists of fragments of the schema graph 300. The basic operations to reorganize fragments are cut, further partitioning a fragment into two, and merge, combining two fragments into one. Since both cut and merge can be done vertically and horizontally, four primitive operations can be used to transform a state to another state: the V-Cut algorithm, the V-Merge algorithm, the H-Cut algorithm, and the H-Merge algorithm as illustrated respectively in FIGS. 4, 5, 6, and 7. These four operations are used to transform the semi-structured data storage schema into a configuration where the cost of the neighboring state may be reduced. Each of these four primitives are now described:

- ✦V-Cut(S, f (u, v)) primitive: cuts the fragment f into two neighboring fragment $f_1$ and $f_2$, such that $f_1 \cup f_2 = f$, where (u, v) is an edge from $f_1$ to $f_2$, i.e. $u \in f_1$, $v \in f_2$.
- ✦V-Merge(S, $f_1$, $f_2$) primitive: merges the fragments $f_1$ and $f_2$ into one fragment f where $f = f_1 \cup f_2$.
- ✦H-Cut(S, f (u, v)) primitive: splits the fragment f into two fragments $f_1$ and $f_2$ horizontally from edge (u,v), where $u \not\equiv v \in f$ such that $ext(f_1) \cup ext(f_2) = ext(f)$, and $ext(f_1) \cap ext(f_2) = \phi$.
- ✦H-Merge(S, $f_1$, $f_2$) primitive: merges two fragments $f_1$ and $f_2$ into one fragment f, such that $ext(f) = ext(f_1) \cup ext(f_2)$.

Figure 4:
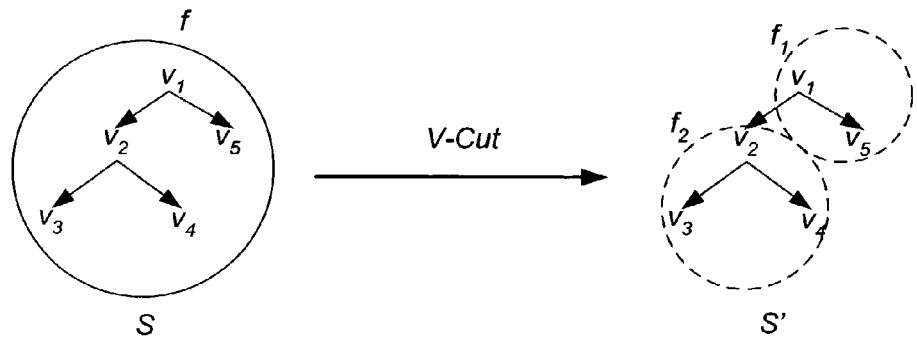
FIG. 4 illustrates one embodiment of a V-Cut operation that cuts a fragment into two fragments vertically along a path.
Figure 5:
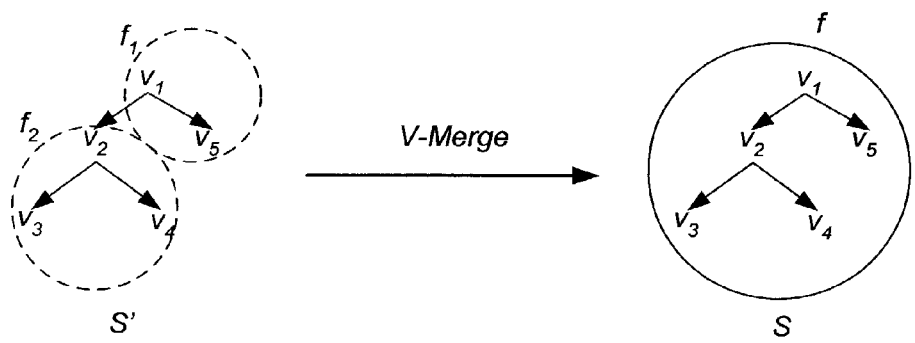
FIG. 5 illustrates one embodiment of a V-Merge operation that merges two neighboring fragments.
Figure 6:
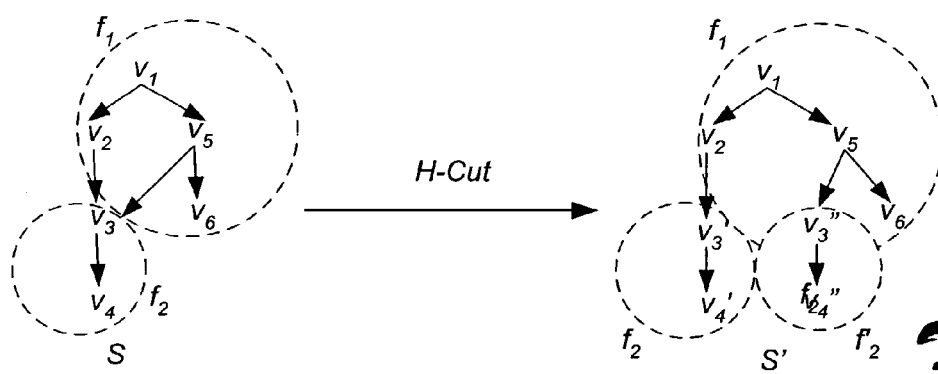
FIG. 6 illustrates one embodiment of a H-Cut operation that divides the instances of a fragment into two groups.
Figure 7:
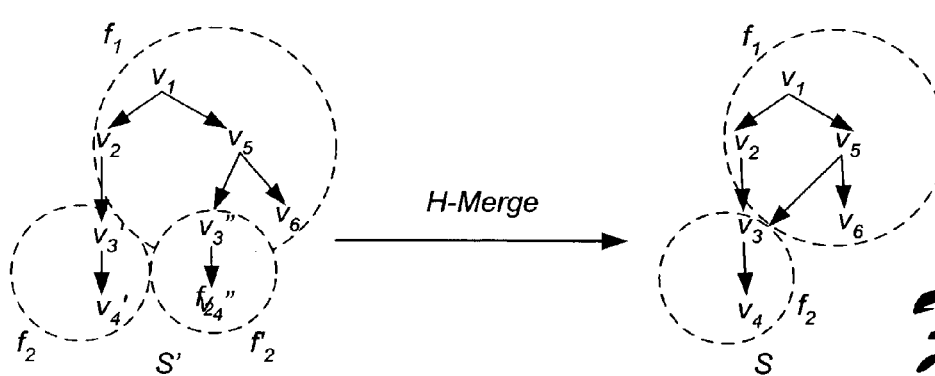
FIG. 7 illustrates one embodiment of the H-Merge operation that merges two neighboring fragments and twin fragments into one fragment.

As shown in FIG. 4, the V-Cut operation cuts a fragment into two fragments vertically along the path. V-cut therefore cuts a tree into two distinct fragments. As shown in FIG. 6, the H-Cut operation divides the instances of a fragment into two groups. With the H-cut, the instance of v3 is segmented into two instances: v'3 and v"3. The first instance v'3 is related to v2. The second instance v"3 is related to v5. The instances of the nodes can therefore be separated using the H-cut algorithm. H-cut is used to separate the instances of the nodes while v-cut is used to fragment the schema (structure) of the state. With H-cut, the schema is maintained while the instances of the nodes are modified. As shown in FIGS. 5, the V-Merge operation merges two neighboring fragments. As shown in FIG. 7, the H-Merge operation merges two neighboring fragments and twin fragments respectively. The Cut and Merge operations are symmetric. That is:

$$V\text{-Cut}(S, f, (u, v)) \to S', f = f_1 \cup f_2, \text{ if and only if V-Merge } (S', f_1, f_2) \to S \quad (5)$$

$$H\text{-Cut}(S, f, (u, v)) \to S', ext(f) = ext(f1) \square ext(f2), \text{ if an only if H-Merge } (S', f1, f2) \to S \quad (6)$$

FIGS. 4, 5, 6, and 7 respectively illustrate the V-Cut, V-Merge, H-Cut, and H-Merge operations by example. In FIG. 4, a state S consists of only one fragment $f = (v_1, v_2, v_3, v_4, v_5)$, and the operation V-Cut(S,f $(v_1, v_2)$) cuts it into two fragment $f_1 = (v_1, v_5)$ and $f_2 = (v_2, v_3, v_4)$ to yield a new state S'. Conversely, the operation V-Merge(S', $f_1$, $f_2$) as shown in FIG. 5 merges the two fragments $f_1$ and $f_2$ into fragment f. In H-Cut, a fragment $f_2 = (v_3, v_4)$ is cut into two twin fragment $f_2' = (v_3', v_4')$ and $f_2'' = (v_3'', v_4'')$ by horizontal cut H-Cut(S, $f_2$, $(v_2, v_3)$). In H-Merge(S', $f_2'$, $f_2''$) merges the two fragment $f_2'$ and $f_2''$ into fragment $f_2$ as well.

A transformation T on state S is denoted with a uniform from T(S, op)→S', where op=(V-Cut, V-Merge, H-Cut, H-Merge), S' is the result state. If there is a transformation T(S, op )→S', then the two state S and S' are neighboring. For example, both the state S and S' in FIG. 5 and FIG. 6 are neighboring. The two state S and S' are reachable if the there are a sequence of primitive operations $T_1, T_2, \ldots, T_n$ that can transform S into S'. Note that for any two states S and S', there always is a sequence of operations that can transform S into S'. Thus, the improved state is reachable from any initial state.

One embodiment of a cost model is described to estimate the running cost of the workload on a mapping schema. Only the cost for evaluating simple path expressions appearing in such a query within structured documents (e.g., an XQuery) is considered in the cost model. An XQuery with regular path expressions can be translated into a group of XQueries with simple path expressions by utilizing the schema graph 300. In another embodiment, an optimizer (e.g., an XQuery optimizer for an XQuery that can be a feature of certain embodiments of SQL) of a server can be used to estimate the cost of the workload.

TABLE 6

Parameters for the Cost Model

| Parameters | Description |
| --- | --- |
| $|E_i|$ | The Instance Number of Element $E_i$ |
| $C_i$ | The field width of element $E_i$ |
| fan(i, j) | The average fan out from element $E_i$ to element $E_j$ |
| $|D_i|$ | The number of elements in the extend of field $f_i$ |
| $|f_i|$ | The size of the extend of fragment $f_i$ |
| Sel($l_1/l_2/ \ldots /l_n$) | The selectivity of simple path $l_1/l_2/ \ldots /l_n$ |
| $Sel_i$ | The selectivity of the path from the root to $f_i$ |

Certain parameters describing the characters of the structured document (e.g., XML) are described in Table 6 that relate to the cost model. The annotation of each node in the schema graph 300 keeps its node size and type. Thus, $|E_i|$ and $C_i$ are available from the node annotations. Fan(i, j) can be derived from $|E_i|$ as follows:

$$fan(i, j) = |E_j|/|E_i| \quad (7)$$

$|D_i|$ and $|f_i|$ are computed as following $$|D_i| = \sum_{E_j \in f_i} |E_j| \text{ and } |f_i| = \sum_{E_j \in f_i} |E_j| * C_j \quad (8)$$

Consider the Markov estimate strategy that derives the selectivity of a simple path from the selectivity of simple path with length 2 as:

$$sel(l_1/l_2/ \ldots /l_n) = sel(l_1/l_2/ \ldots /l_{n-1}) * fan(l_{n-1}, l_n) = \quad (9)$$

$$\prod_{i=1}^{n-1} fan(l_i, l_{i+1}) \quad (10)$$

Figure 8:
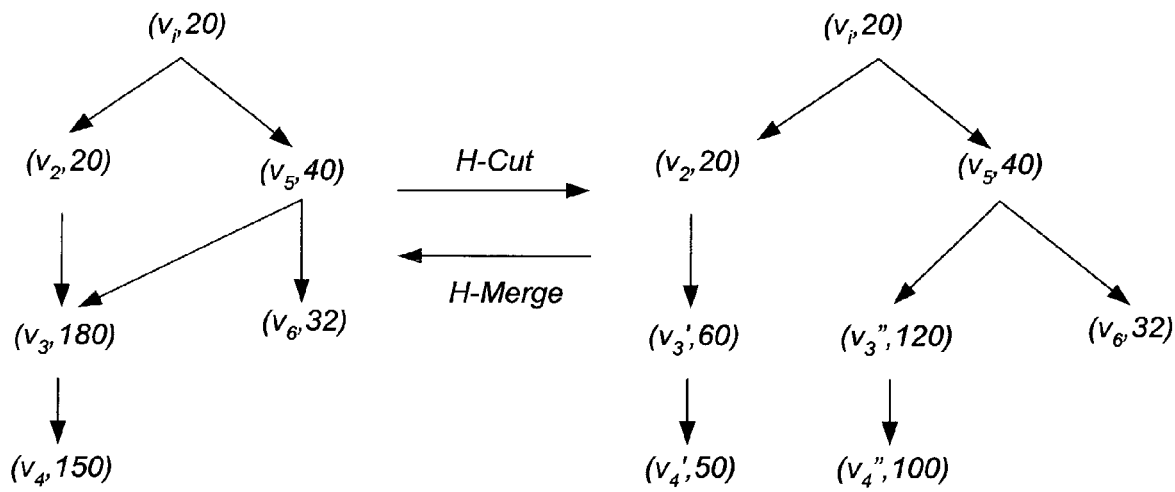
FIG. 8 illustrates one embodiment of an estimated node size in state transformation for an H-Cut and H-Merge operation.
Figure 9:
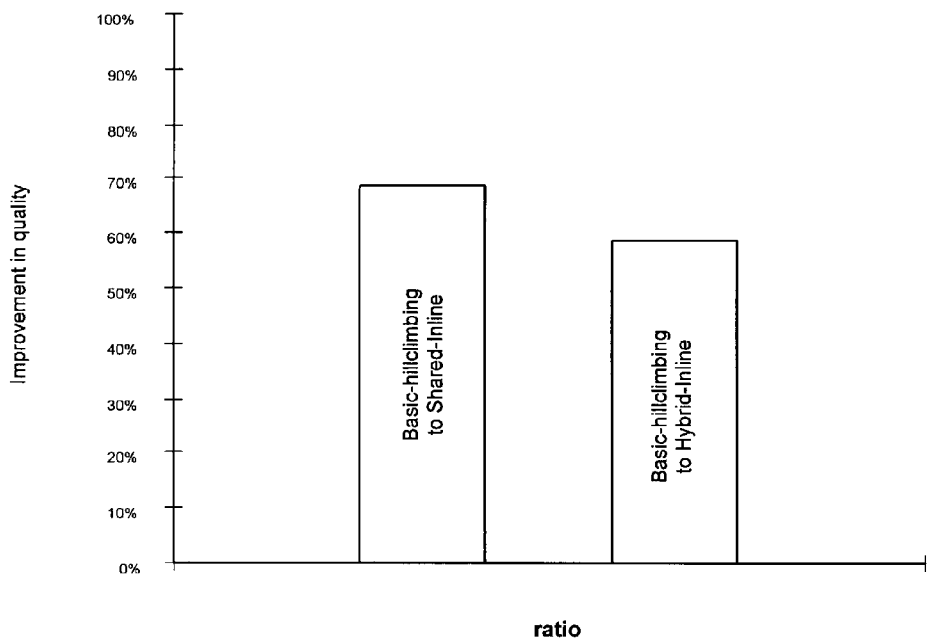
FIGS. 9 illustrates one embodiment of bar graphs showing the improvement from the Basic-Hill algorithm to the Shared-Inline algorithm compared to the improvement from the Basic-Hill algorithm to the Hybrid-Inline algorithm.

FIG. 8 illustrates one embodiment of estimated node size in state transformation. Table 7 illustrates the average fan out for the various nodes illustrated in FIG. 8.

TABLE 7

Average fan out for various nodes (see FIG. 8)

| fan(i, j) | Values |
|---|---|
| fan($v_1$, $v_2$) | 1 |
| fan($v_1$, $v_5$) | 2 |
| fan($v_2$, $v_3$) | 3 |
| fan($v_3$, $v_4$) | 0.8333 |
| fan($v_5$, $v_3$) | 3 |
| fan($v_5$, $v_6$) | 0.9 |

When a horizontal transformation is put on a state, the annotation information is changed because nodes in the schema graph 300 could be inserted (by H-Cut) or deleted (by H-Merge). FIG. 8 and Table 7 illustrate this with the H-Cut/H-Merge example. In Table 7, the number on the right side of each node indicates its number of instance. The fragment $f=(v_3, v_4)$ is cut into two twin fragment $f_2'=(v_3', v_4')$ and $f_2''=(v_3'', v_4'')$ by the H-Cut(S, $f_2$, $(v_2, v_3)$) operation. Now, $v_3'$ represents all of the target nodes of path $v_1/v_2/v_3'$, while $v_3''$ indicates all of the target nodes of path $v_1/v_5/v_3$. Similar situations happen on all of the nodes in $f_2'$ and $f_2''$. This allows the algorithm to collect the size information again in hillclimbing the XML document, which would largely reduce the efficiency of the algorithm due to repeated scanning. Thus, a size estimation strategy that derives the size of those nodes not by scanning the XML documents, but by deriving from the preceding state is proposed. In general, if the transformation is H-Cut(S, f (u, v))→S, which splits f into $f_1=(v_1', v_2', \ldots, v_{m1}')$ and $f_2=(v_1'', v_2'', \ldots, v_{m2}'')$, and suppose the path from u to $v_i'$ is $P(u, v_i')$, then the size of $v_i'$ can be derived as following $$|v_i'|=|u|*sel(P(u, v_i')) \quad (11)$$

and the size of $v_i''$ is $$|v_i''|=|v|-|v_i'| \quad (12)$$

When two nodes $v_1$ and $v_2$ are merged into a node v, the size of node v in the resulting state is the sum of the sizes of $v_1$ and $v_2$.

The cost formula (for an XQuery) of a workload W on a state S is:

$$Cost(W, S) = \sum_{i=1}^{n} W_i * Cost(Q_i, S) \quad (13)$$

Assume that the fragment set accessed by query $Q_i$ is $\{f_{i1}, f_{i2}, \ldots, f_{ik}\}$, then the cost of a query $Q_i$ in the state S is estimated by following function.

$$Cost(Q_i, S) = \begin{cases} |f_{i1}| & \text{if } k = 1 \\ \sum_{i,j} (|f_i| + \delta * (|D_i| + |D_j|)) & \text{if } k > 1, f_i \text{ and } f_j \text{ are neighboring} \end{cases} \quad (14)$$

If $Q_i$ only accesses a fragment, i.e. k=1, then the cost of $Q_i$ can be estimated by the size of the fragment. Otherwise, the cost is estimated by the cost for evaluating the simple path expressions appearing in $Q_i$. The formula $|f_i|+\delta*(|D_i|+|D_j|)$ simulates the cost for joining the two relations corresponding to fragment $f_i$ and $f_j$. $\delta$ is a coefficient and its default value is 3 in one implementation.

Two techniques that speed up the hillclimbing search are described. One technique is referred to herein as the "candidate neighboring state" technique, which reduces the number of neighboring states to the current state. Another technique is the "delta query" technique, which reduces unnecessary cost estimations.

Figure 13:
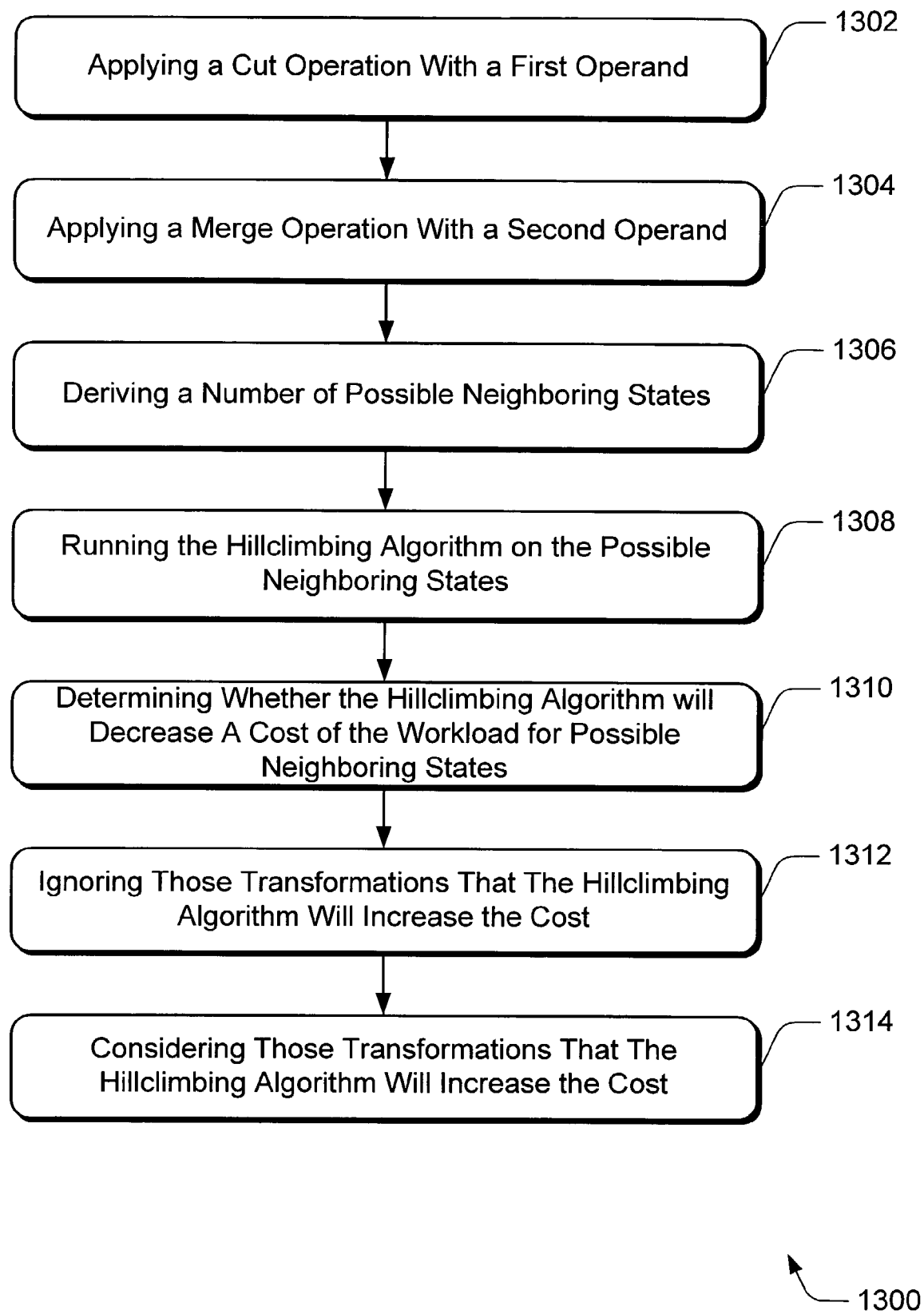
FIG. 13 illustrates one embodiment of candidate neighboring states algorithm that can speed up the operation of a hillclimbing algorithm.

The candidate neighboring states technique 1300 is described relative to FIG. 13. The candidate neighboring state algorithm 1300 can run in a computer environment 500 as illustrated in FIG. 10. As part of the hillclimbing algorithm for semi-structured data storage schema selection as described herein, the cut and merge operations can be applied with different operands as described in 1302 and 1304 in FIG. 13. As such, a number of possible resulting neighboring states are derived as illustrated in 1306 in FIG. 13. All of the neighboring states of state S are included in the set described in equation 15:

$$N(S)=\{S'|\text{there is a transformation } T(S, op) \rightarrow S'\} \quad (15)$$

For each neighboring state, the hillclimbing algorithm as shown in 1308 in FIG. 13 estimates the cost of the workload of the new state to examine whether the new state is better than the old one. In some cases in 1310, it can be determined whether a transformation will reduce or increase the cost of the workload without estimating the cost of the workload. By reducing those transformations that increase the cost of the workload as shown in 1312 in FIG. 13, the number of candidate neighboring states that are to be considered can be reduced in 1314 in FIG. 13.

The observations of the candidate neighboring state and delta query algorithms are based on the notation of associated query. A query and a fragment are considered associated if the query accesses the fragment. All of the queries associated with a fragment f are called the associated query set of f, denoted as AQ(f). The equation AQ(f)={AQ(v)|v∈f} applies. If the associated query set of two fragments $f_1$ and $f_2$ are disjoint, i.e. AQ($f_1$)∩AQ($f_2$)=ϕ, then it is concluded that the cut operations on f would reduce the cost of the whole workload, because it removes the unused parts for the queries in AQ($f_1$) and AQ($f_2$). Similarly, if a merge operation involves two fragment $f_1$ and $f_2$ with a disjoint associated query set, the new state will increase the cost of the queries in AQ($f_1$) and AQ($f_2$), hence the whole workload.

One embodiment of speeding up the hillclimbing search cost that uses the delta queries is now described. A naive cost evaluation on the state transformation needs to estimate the cost of each query in the workload on the new state. However, since each transformation on a state only modifies a part of the fragments in the state, it is unnecessary to evaluate the cost of all the queries in the workload against the new state. This is clarified based on the concept of "delta queries". A query to a transformation operation is called a "delta query" if at least an element (attribute) in the query appears in the fragments affected by the transformation operation. For example, the query described relative to the state transformation illustrated relative to the schema graph 300 illustrated in FIG. 3 is a delta query to the transformation V-Cut(S, {annotation, author, description, happiness}, (open_auction, annotation)), but not a delta query to the transformation V-Cut(S, {closed_auction, buyer, price}, (closed_auction, buyer)).

Theorem 1: Let W be the workload and $W_A$ be the set of delta queries to a transformation operation from state S to S', then the incurred cost change by the transformation can be derived as set forth in equation 16:

$$\Delta C = \text{Cost}(S', W_A) - \text{Cost}(S', W_A) \quad (16)$$

Table 8 provides one embodiment of hillclimbing algorithm with heristics.

TABLE 8

Hillclimbing Algorithm with Heuristics

Input: An initial state S, and a group of workload
W=(($w_1,Q_1$), ($w_2,Q_2$), ..., ($w_1,Q_m$));
   Output: an improved state that has a reduced cost.
   $S_0$= an initial state {$f_1, f_2, ..., f_n$};
   While N($S_0$) ≠ φ do
     S = T($S_0$, op);
     Case op of
        V-Cut or H-Cut:
           If AQ($f_1$)∩AQ($f_2$)=φ then
               Δc=1;
           Else
               Δc=Cost(AQ(f), $S_0$)–Cost(AQ(f), S);
        V-Merge or H-Merge:
           If AQ($f_1$)∩AQ($f_2$)=φ then
               Δc=–1;
           Else
               Δc=Cost(AQ($f_1$)□AQ($f_2$), $S_0$)–
                  Cost(AQ($f_1$)□AQ($f_2$), S);
     If Δc<0 then
        $S_0$=S;
     Else
        N($S_0$)= N($S_0$)– S;
return($S_0$);

If the transformation operation is V-Cut(S, f (u, v)) or H-Cut(S, f(u, v)), then delta queries to this transformation are all of the queries that associated to fragment f, i.e. $W_A$=AQ(f). The delta queries to merge operation V-Merge(S, $f_1$, $f_2$) or H-Merge(S, $f_1$, $f_2$) are the queries that associated to either $f_1$ or $f_2$, that is, $W_A$=AQ($f_1$)□AQ($f_2$). In this disclosure, the symbol "□" symbol means the union of two sets. Thus, for the operations cutting f only the cost of queries in AQ(f) on the new state is estimated. For operations merging $f_1$ and $f_2$, only the estimate the cost of those queries in the AQ($f_1$)□AQ($f_2$) is estimated. FIG. 8 specifies the hillclimbing algorithm that exploits the candidate neighboring states and the delta query techniques.

FIG. 10 illustrates an example of a suitable computer environment or network 500 which includes a user interface that can, using the correct software and hardware, provide one embodiment of the semi-structured data storage schema selector 100. Similar resources may use the computer environment and the processes described herein.

The computer environment 500 illustrated in FIG. 10 is a general computer environment, which can be used to implement the techniques of the semi-structured data storage schema selector 100 described herein. The computer environment 500 is only one example of a computer environment and is not intended to suggest any limitation as to the scope of use or functionality of the computer and network architectures. Neither should the particular computer environment 500 be interpreted as having any dependency or requirement relating to any one or combination of components illustrated in the exemplary computer environment 500.

The computer environment 500 includes a general-purpose computing device in the form of a computer 502. The computer 502 can be, for example, one or more of a stand alone computer, a networked computer, a mainframe computer, a PDA, a telephone, a microcomputer or microprocessor, or any other computer device that uses a processor in combination with a memory. The components of the computer 502 can include, but are not limited to, one or more processors or processing units 504 (e.g., including a cryptographic processor or co-processor), a system memory 506, and a system bus 508 that couples various system components including the processor 504 and the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 502 typically includes a variety of computer readable media. Such media can be any available media that is accessible by the computer 502 and includes both volatile and non-volatile media, and removable and non-removable media.

The system memory 506 includes the computer readable media in the form of non-volatile memory such as read only memory (ROM) 512, and/or volatile memory such as random access memory (RAM) 510. A basic input/output system (BIOS) 514, containing the basic routines that help to transfer information between elements within the computer 502, such as during start-up, is stored in the ROM 512. The RAM 510 typically contains data and/or program modules that are immediately accessible to, and/or presently operated on, by the processing unit 504.

The computer 502 may also include other removable/non-removable, volatile/non-volatile computer storage media. By way of example, FIG. 10 illustrates a hard disk drive 515 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 515, magnetic disk drive 518, and optical disk drive 522 are each connected to the system bus 508 by one or more data media interfaces 527. Alternatively, the hard disk drive 515, magnetic disk drive 518, and optical disk drive 522 can be connected to the system bus 508 by one or more interfaces (not shown).

The disk drives and their associated computer-readable media provide non-volatile storage of computer readable instructions, control node data structures, program modules, and other data for the computer 502. Although the example illustrates a hard disk within the hard disk drive 515, a removable magnetic disk 520, and a non-volatile optical disk 524, it is to be appreciated that other types of the computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computer environment 500.

Any number of program modules can be stored on the hard disk contained in the hard disk drive 515, magnetic disk 520, non-volatile optical disk 524, ROM 512, and/or RAM 510, including by way of example, the OS 526, one or more application programs 528, other program modules 530, and program data 532. Each OS 526, one or more application programs 528, other program modules 530, and program data 532 (or some combination thereof) may implement all or part of the resident components that support the distributed file system.

A user can enter commands and information into the computer 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor, flat panel display, or other type of computer display 200 can also be connected to the system bus 508 via an interface, such as a video adapter 544. The computer display is able to display such outputs from the semi-structured data storage schema selector 100 as described above. In addition to the computer display 200, other output peripheral devices can include components such as speakers (not shown) and a printer 546 that can be connected to the computer 502 via the input/output interfaces 540.

Computer 502 can operate in a networked environment using logical connections to one or more remote computers, such as a remote computer device 548. By way of example, the remote computer device 548 can be a personal computer, portable computer, a server, a router, a network computer, a peer device or other common network node, game console, and the like. The remote computer device 548 is illustrated as a portable computer that can include many or all of the elements and features described herein relative to the computer 502.

Logical connections between the computer 502 and the remote computer device 548 are depicted as a local area network (LAN) 550 and a general wide area network (WAN) 552. Such networking environments are commonplace in offices, enterprise-wide computer networks, intranets, and the Internet.

When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to the computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with the computer environment 500, program modules depicted relative to the computer 502, or portions thereof, may be stored in a remote memory storage device. By way of example, remote application programs 558 reside on a memory device of the remote computer 548. For purposes of illustration, application programs and other executable program components such as the operating system are illustrated herein as discrete blocks, although it is recognized that such programs and components reside at various times in different storage components of the computer 502, and are executed by the data processor(s) of the computer 502. It will be appreciated that the network connections shown and described are exemplary and other means of establishing a communications link between the computers may be used.

Various modules and techniques may be described herein in the general context of the computer-executable instructions, such as program modules, executed by one or more computers or other devices. Generally, program modules include routines, programs, control objects, components, control node data structures, etc. that perform particular tasks or implement particular abstract data types. Typically, the functionality of the program modules may be combined or distributed as desired in various embodiments.

An implementation of these modules and techniques may be stored on or transmitted across some form of the computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any process or technology for storage of information such as semi-structured data which is contained in the form of computer readable instructions, control node data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, control node data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Experimental Results

The semi-structured (i.e. XML) data storage schema selection tool 200 has been implemented on a computer system running a relational database such as, for example, a SQL Server. A sequence of experiments were conducted to evaluate the effectiveness of the tool. The impact of initial states on the performance of the hillclimbing algorithm was considered in the first set of experiments. The selection of the initial states have little impact on the cost of the workload. The result of hillclimbing and previous storage approaches, i.e. the Shared-Inline and Hybrid-Inline, were considered in the second set of experiments. The cost of the workload on the recommended semi-structured data storage schema produced by the hillclimbing algorithm is substantially lower (i.e., improved) than that on the schema generated by the Shared-Inline and Hybrid-Inline algorithms. The third set of experiments examined the effectiveness of the candidate neighboring states and delta query techniques that show that the hillclimbing algorithm using these techniques significantly reduces running time compared to the hillclimbing algorithm that does not include these techniques.

Experiments were conducted that related to the ability of the hillclimbing algorithm to select a semi-structured data storage schema. The test data and workload used for our tests coming from the XML benchmark located at the website (http://monetdb.cwi.nl/xml/Benchmark/benchmark.html). The XML generator is used in the benchmark to structured (i.e., XML) documents first and then bulkload the structured documents into SQL Server. Multiple queries (XQueries) from the benchmark queries were used as our workload for the test. Those queries are translated into SQL statements. In experiments, the cost of the workload was considered as a measure of the quality of resulting semi-structured data storage schema.

Experimental results indicate the impact of the initial states on the quality of the recommended semi-structured data storage schema produced by the hillclimbing algorithms. The quality of different versions of hillclimbing algorithms starting from different initial states is as follows:

1) Basic-Hillclimbing: using the mapping schema of Basic_Inline as the initial state;
2) Shared-Hillclimbing: using the mapping schema of Shared-Inline as the initial state;
3) Hybrid-Hillclimbing: using the mapping schema of Hybrid-Inline as the initial state.

Experimental results indicate that the execution time of the 18 queries on these three algorithms are close to each other. In addition, the overall costs of the workload on the recommended semi-structured data storage schema generated by those three algorithms are shown to be very close to each other. These experiments differ from the traditional hillclimbing algorithms that indicate that the initial state makes a considerable difference on the quality of the semi-structured data storage schema. By comparison, the present embodiment illustrates that for the problem of semi-structured data storage schema selection, the initial states have little impact on the quality of the recommended schema. In fact, the quality of the hillclimbing algorithm starting from other initial states have been extensively studied, and the results have been found to be quite similar.

The quality of the semi-structured data storage schemas recommended by the hillclimbing algorithms are evaluated. In the following discussion, we consider the Basic-Hillclimbing algorithm. In particular, the quality is compared to the Shared-Inline and the Hybrid-Inline algorithms. In those comparisons, the quality improvement of hillclimbing on the Shared-hillclimbing or Hybrid-hillclimbing approaches are indicated by equation 17:

$$\text{Improvement}(\text{Basic-Hillclimbing},\Omega)=(\text{Cost}(\Omega)-\text{Cost}(\text{Basic Hillclimbing}))/\text{Cost}(\Omega) \quad (17)$$

where $\Omega$ can be the Shared-Inline algorithm or the Hybrid-Inline algorithm.

Table 9 compares the Basic-Hillclimbing algorithm to the Shared-Inline algorithm. This shows that the running times of the queries are not reduced significantly, and the time of some queries even increase. However, the contribution of those queries whose cost increase the cost of the whole workload is tiny, lower than 1%, while the cost of most of the queries that contribute to the 99 percent of the workload are reduced significantly, by nearly 70%.

TABLE 9

Improvement of Shared-Inline Algorithm Compared to Basic Hillclimbing Algorithm

| Workload | Ratio of Cost | Percentage Improvement in Quality |
|---|---|---|
| Q1, Q3, Q5, Q6, Q7, Q8, Q9, Q10, Q11, Q12, Q13, and Q14 | 99.63% | 69.43% |
| Q2, Q4, Q15, Q16, and Q17 | 0.28% | −71.52% |

Table 10 quantitatively compares the Basic-Hillclimbing algorithm to the Hybrid-Inline algorithm. Similarly, 40% of the queries increase the running time by 350%, but only represent 1-2% of the total workload. The cost of the remaining 60% of the queries improve the quality by 64%. The overall improvement is 60%.

Table 10 also illustrates one embodiment of bar graphs showing the improvement of the Basic-Hillclimbing algorithm compared to the Shared-Inline algorithm and the Hybrid-Inline algorithm. The Basic-Hillclimbing improves the quality compared to the Shared-Inline algorithm by nearly 70% and the Hybrid-Inline algorithm by 60%.

TABLE 10

Improvement of Hybrid-Inline Algorithm Compared to Basic Hillclimbing Algorithm

| Workload | Ratio of Cost | Percentage Improvement in Quality |
|---|---|---|
| Q1, Q4, Q5, Q6, Q7, Q8, Q10, Q11, Q12, and Q13 | 99.80% | 63.65% |
| Q2, Q3, Q9, Q14, Q15, Q16, and Q17 | 1.20% | −350.82% |

To evaluate the Candidate Neighboring States technique and the Delta Query technique to speed up the hillclimbing algorithm, experiments were run in which two versions of the basic-hillclimbing algorithm were utilized. One version used the candidate neighboring states while the other did not. The attempt times of the Hillclimbing algorithm is used as a rough measure of the search space. The candidate neighboring states algorithm reduces the search space substantially (by over forty percent).

This disclosure provides an improved semi-structured data storage schema selection for semi-structured data with an expected workload, even in the presence of space constraints. A hillclimbing algorithm that can pick out the improved semi-structured data storage strategy for the semi-structured data in reasonable time is presented. The algorithm is implemented in an automatic semi-structured data storage selection tool. Experimental results indicate the effectiveness of the algorithm.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An apparatus comprising:
a computer processor;
a memory coupled to the computer processor;
a semi-structured data storage schema portion, a workload schema portion, and a semi-structured data storage schema selection portion stored in the memory executed by the computer processor;
the semi-structured data storage schema portion for providing semi-structured data, wherein the semi-structured data comprises a semi-structured data storage schema and a semi-structured data storage;
the workload schema portion for providing workload input, wherein the workload input comprises structured queries;
the semi-structured data storage schema selection portion for:
selecting an improved semi-structured data storage schema for a relational schema in response to the semi-structured data and in response to the workload input, wherein the improved semi-structured data storage schema is selected by using an initial state represented within the semi-structured data;
calculating a cost for the initial state, wherein the cost is based on a cost model, wherein the cost model includes parameters comprising an instance number of an element, a field width of the element, an average fan out from one element to another element, a number of elements in an extend of a field, a size of the extend of a fragment, a selectivity of a simple path, and the selectivity of a path from a root to the fragment;
transforming the initial state within the semi-structured data to a neighboring state represented within the semi-structured data and the semi-structured data storage schema selection portion segments the semi-structured data based on the selected improved semi-structured data storage schema, wherein the semi-structured data storage schema selection portion is based on a hillclimbing algorithm;
comparing the cost of the initial state to the cost of the neighboring state; and
determining whether the cost of the neighboring state is smaller than the cost of the initial state, wherein the cost of the neighboring state is smaller, the neighboring state is used.

2. The apparatus of claim 1, wherein the hillclimbing algorithm includes a delta query hillclimbing algorithm.

3. The apparatus of claim 1, wherein the hillclimbing algorithm includes a candidate neighboring state hillclimbing algorithm.

4. An apparatus comprising:
a processor;
a memory coupled to the processor;
a semi-structured data storage schema portion, a workload schema portion, and a semi-structured data storage schema selection portion stored in memory executed by the processor;
the semi-structured data storage schema portion for providing semi-structured data, wherein the semi-structured data comprises a semi-structured data storage schema and a semi-structured data storage;
the workload schema portion for providing workload input, wherein the workload input comprises structured queries;
the semi-structured data storage schema selection portion for:
selecting an improved relational schema in response to the semi-structured data and in response to the workload input including selecting an initial state represented within the semi-structured data;
calculating a cost for the initial state, wherein the cost is based on a cost model, wherein the cost model includes parameters consisting of an instance number of an element, a field width of the element, an average fan out from one element to another element, a number of elements in an extend of a field, a size of the extend of a fragment, a selectivity of a simple path, and the selectivity of a path from a root to the fragment;
transforming the initial state within the semi-structured data to a neighboring state represented within the semi-structured data, wherein the semi-structured data storage schema selection portion segments the semi-structured data based on the selected improved semi-structured data storage schema, wherein the semi-structured data storage schema selection portion is based on an algorithm; and
determining whether the cost of the neighboring state is smaller than the cost of the initial state, wherein the cost of the neighboring state is smaller, the neighboring state is used.

5. The apparatus as recited in claim 4, further comprising a relational database for storing the semi-structured data storage schema in the relational schema.

6. The apparatus as recited in claim 4, wherein the relational database is a SQL database.

7. The apparatus as recited in claim 4, wherein the semi-structured data storage schema selection portion is based on a hillclimbing algorithm.

8. The apparatus a recited in claim 4, wherein the improved semi-structured data storage schema is selected based on a local maximization algorithm.

9. The apparatus a recited in claim 4, wherein the improved semi-structured data storage schema is selected based on a hillclimbing algorithm.

* * * * *